Patented Mar. 23, 1943

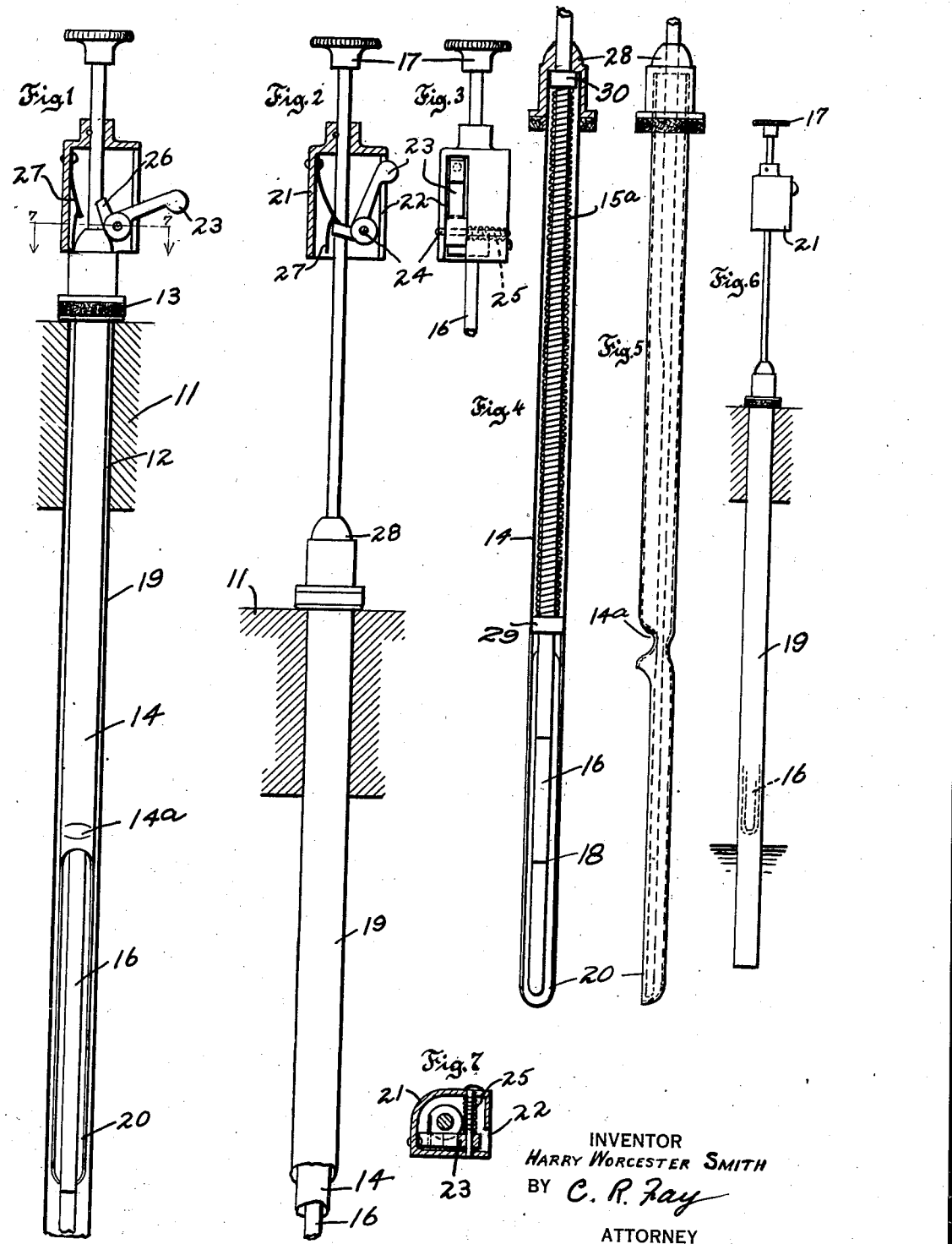

2,314,430

UNITED STATES PATENT OFFICE 2,314,430

DIP STICK

Harry Worcester Smith, Worcester, Mass.

Application February 26, 1941, Serial No. 380,704

5 Claims. (Cl. 33—126.7)

This invention relates to a so-called dip stick principally for use in measuring the oil level in an automobile engine.

The principal objects of the invention are to provide a dip stick which will have to be removed from the oil tank only once in order to determine the level of the oil and will prevent the dripping of the oil while it is being inspected to show the level; to provide a construction by which the dip stick is protected from the waves in the oil caused by the running of the car; to provide a dip stick with a potector for holding the oil that drips from it to prevent its dropping and having means whereby the stick will be held out of the oil while the car is running and can be removed with the greatest simplicity and the dip stick put down into the oil with equal simplicity to ascertain the oil level; and the provision of an indicating device by which it may be ascertained whether or not the dip stick has been thrust to its innermost position in the oil tank.

Other objects and advantages of the invention will appear hereinafter.

Reference is to be had to the accompanying drawing, in which

Fig. 1 is a sectional view of a preferred form of dip stick shown as it is when thrust to its innermost position in the oil tank;

Fig. 2 is an elevational view of the construction shown in Fig. 1, but with the dip stick in normal position;

Fig. 3 is a detail view of the indicating device;

Fig. 4 is a longitudinal section of the construction shown in Fig. 2, with parts broken away and the fixed tube omitted;

Fig. 5 is a side elevation of the construction of Fig. 4;

Fig. 6 is an elevational view of the entire device as applied to an oil tank; and Fig. 7 is a section on line 7—7 of Fig. 1.

The invention is shown as applied to the oil tank of an automobile having an engine block 11 and an opening 12 thru the top which is covered by a perforated felt washer 13. Thru this felt washer extends the dip stick 14, which is in the form of a tube.

A bent-in portion 14a forms a stop for a collar 29 thru which a rod 16 is slidable. Another collar 30 is fast to the rod, and a compression spring 15a between the collars normally holds the rod in raised position. The top of the rod has a button 17 by which it may be depressed down thru a tube 19 fixed to the top 11 of the tank. Tube 19 surrounds and protects tube 14. The bottom of the rod involves a scale 18. The tube 19 is open at the bottom and therefore the level of the oil inside this tube is the same always as that on the outside.

Under ordinary running condtiions, the spring 15a pulls up the rod 16 into the position shown in Figs. 2 and 6, and the scale 18, therefore, is moved up far enough so that it does not touch the oil in the tank or rather in the tube 19. It runs dry. Of course, after being used, the oil drips away from it by gravity and it is always dry when it is desired to use it and always above the oil level. When it is desired to use it, the thumb is pressed on the knob 17 so as to force the bottom of the rod 16 and the scale 18 down into the oil. Of course, the knob is always forced down to the same point, this being controlled by a device to be described. Now the dip stick is removed and the knob released which brings the scale up to the point indicated in Fig. 4. The dip stick is held in horizontal position with a substantially semi-circular wall 20 underneath the scale 18 and entirely protecting it from the dripping of oil. However, the oil will run off the scale by gravity sufficiently so that the scale can be observed and measured by the eye. This is done by removing the dip stick only once from the tank. It does not have to be wiped largely because the tank is always heated by the engine and the oil on the dip stick is largely evaporated and also because the dip stick is removed only one for each operation.

The indicator device comprises a housing 21 having a slot 22 thru which a lever 23 pivoted on a pin 24 may extend. A coil spring 25 surrounds pin 24 and is arranged to normally urge the lever to position shown in Fig. 7. Lever 23 is in the form of a bell-crank having a lug 26 which is adapted to be engaged by a teat on a leaf spring 27 when the lever is pressed back in the slot 22 against action of spring 25. There is an abutment 28 secured to the washer 13 on tube 14.

With the dip stick in normal running condition as in Fig. 2, spring 27 retains lever 23 in the housing, but if the button 17 is depressed to its full extent, and only if this is done, the abutment 28 will engage the end of spring 27 and displace it to the left, thus releasing the lug 26 and allowing spring 25 to pivot the lever to extended position, Fig. 1. The lever is maintained extended by spring 25 until forced back by the operator regardless of the relative position of housing 21 and abutment 28, as this spring will engage under lug 27 when the abutment is removed. It will be clear that if the owner of the car sees the lever 23 extended he can be sure that the gas station attendant has thrust the dip stick to its innermost extent in the oil tank.

Having thus described my invention and the advantages thereof, I do not wish to be limited to the details herein disclosed, otherwise than as set forth in the claims, but what I claim is:

1. The combination with a perforated washer for covering a filling opening in an oil tank, a vertical metal tube filling the opening and supported by the washer and removable therewith, said tube being substantially semi-cylindrical at the bottom, a dip stick movably mounted in the tube and having a scale at the bottom adapted to be exposed at the space opposite the semi-cylindrical part, and yielding means in the tube for normally moving the dip stick entirely within the tube above the oil level.

2. The combination with a vertical metal tube substantially semi-cylindrical at the bottom, a dip stick slidably mounted in and longitudinally of the tube and having a scale at the bottom adapted to be exposed at said semi-cylindrical portion, a stationary outer tube surrounding the first named tube and extending nearly to the bottom of the first named tube but not quite, whereby the oil will reach the same level inside and outside the outer tube, means for pushing down the dip stick into the oil to immerse the same, and yielding means for normally moving the dip stick entirely up within the tube above the oil level.

3. The combination of a vertical metal tube cut away to form a substantially semi-cylindrical portion at the bottom, a dip stick slidably mounted in and longitudinally of the tube and having a scale at the bottom adapted to be exposed thru said semi-cylindrical portion, a stationary outer tube surrounding the first named tube and adapted to extend nearly to the bottom of an oil tank but not quite, said dip stick and first-named tube being removable together out of the tank, whereby the scale can be read at the semi-cylindrical portion of the tube.

4. A dip stick comprising a tube, a rod slidably mounted in said tube, a spring normally maintaining an end portion of said rod housed within said tube, said rod being in part projectible from said tube into oil gauging position, and means forming an aperture in said tube for reading the oil mark when said rod has its end portion housed.

5. A dip stick comprising a tube, a rod mounted to slide in said tube, indicating marks on said rod adjacent an end portion thereof, spring means normally maintaining said end portion housed in the tube, means for projecting said end portion beyond an end of the tube for insertion in a liquid, and a cut-away portion on said tube for reading the rod when said end is housed in the tube.

HARRY WORCESTER SMITH.